Figure 1:
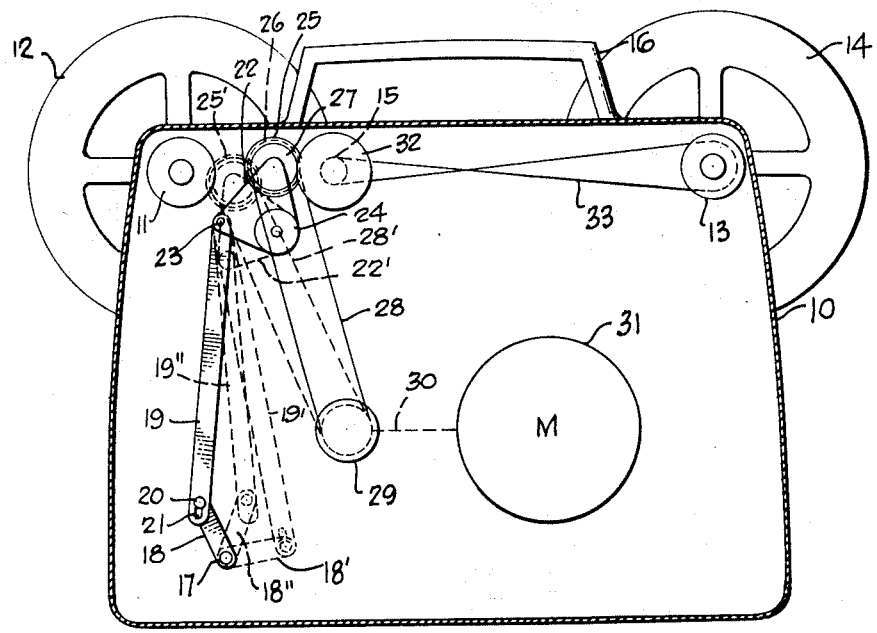

Jan. 30, 1962     O. R. NEMETH     3,018,976

MOTION PICTURE PROJECTOR FILM FEEDING AND REWIND APPARATUS

Filed Sept. 9, 1958

INVENTOR.
OTTO R. NEMETH
BY Elliott & Pastoriza
ATTORNEYS

_United States Patent Office_ 3,018,976
Patented Jan. 30, 1962

3,018,976
MOTION PICTURE PROJECTOR FILM FEEDING AND REWIND APPARATUS
Otto R. Nemeth, Santa Monica, Calif., assignor, by mesne assignments, to Mansfield Industries, Inc., Chicago, Ill., a corporation of Delaware
Filed Sept. 9, 1958, Ser. No. 759,905
9 Claims. (Cl. 242—55.12)

This invention generally relates to motion picture projectors and more particularly concerns a simplified and novel film feeding and rewind mechanism.

An object of the present invention is to provide a film feeding and rewind mechanism for a motion picture projector which is mechanically simple in its structure and operation such that the apparatus may be produced economically with a minimum number of parts.

Another object of the present invention is to provide a film feeding and rewind mechanism for a motion picture projector, which although structurally simple, is positive and rugged in its operation such that it will be relatively maintenance free over the usable life of the associated projector.

Another object of the present invention is to provide a film feeding and rewind apparatus for a motion picture projector which may be conveniently embodied on the back panel of the projector and yet which will effectively cofunction with the take-up reel and rewind reel mounted on the front panel of the projector.

Still another object of the present invention is to provide a film feeding and rewind mechanism for a motion picture projector which is operable to establish either the film feeding or rewind drives by simple manipulation of a single manually operable rotatable means or control knob.

These and other objects and advantages of the present invention are generally achieved by providing a motion picture projector manually operable rotatable means, for example, in the form of a control knob coupled to the projector. Of course, the projector would include the conventional spaced take-up reel rotary means and rewind reel rotary means as well as the usual motor drive and lamp.

The manually operable rotatable means or knob is adapted for disposition in three given angularly spaced locations, which may be identified as the rewind, off, and forward or projecting positions.

Pivotable shifting means are coupled to the projector and adapted for angular movement about a given pivot point. Linkage means are coupled between the rotatable means or control knob and a first portion of the shifting means. The first portion of the shifting means is spaced from the given pivot point of the shifting means so that the shifting means will be actuated from a first position to a second position in response to movement of the rotatable means from the forward position to the rewind position.

Driving means are further embodied in the projector and coupled to the motor and to a second portion of the shifting means spaced from the given pivot point. The driving means is adapted to engage the take-up reel rotary means in the first position of the shifting means and to engage the rewind reel rotary means in the second position of the shifting means.

Figure 2:
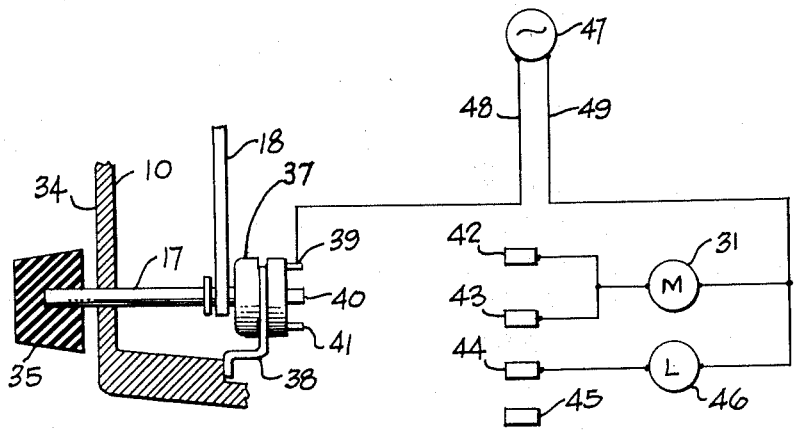
Figure 3:
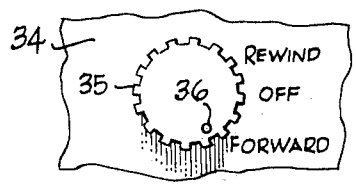

A better understanding of the present invention will be had by reference to the drawings, showing merely a schematic illustrative embodiment of the present invention, and in which:

FIGURE 1 is a rear elevational view of a motion picture projector, partially schematic, illustrating the film feeding and rewind mechanism of the present invention embodied therein;

FIGURE 2 is an enlarged sectional view of the manually rotatable means or control knob for actuating the film feeding and rewind apparatus shown in FIGURE 1; FIGURE 2 also illustrates schematically the inner connection of the control knob to the electrical components and source of electrical power; and, FIGURE 3 is a front view of the control knob of FIGURE 2 showing its relationship to identifying nomenclature on the front panel of the projector.

Referring now to the drawings, there is shown in FIGURE 1 a motion picture projector provided with a back panel 10. The back panel 10 has extending therethrough a conventional rewind shaft coupled on the back side of the panel to a rewind roller 11 and on the front side of the panel to a rewind reel 12. Similarly, a take-up shaft or spindle extends through the panel 10 to connect on the back side thereof with a take-up pulley 13 and on the front side of the projector with a take-up reel 14. The structural details with respect to the rewind reel means and the take-up reel means have not been shown since conventional shafts or spindles may be used which merely serve to effect rotative movement of the respective reels 12 and 14 in response to corresponding rotative movement of the respective roller 11 and pulley 13.

Disposed intermediate the roller 11 and pulley 13 is an idler pulley 15 suitably journaled to the panel 10. The projector may additionally be provided with a conventional handle 16.

A shaft 17 projects through the lower portion of the back panel 10 and has connected thereto a linkage arm 18. The arm 18 is coupled to an arm 19 as at 20. The connection means 20 is such that the arm 19 may pivot with respect to the arm 18. Furthermore, the arm 19 is provided at its end adjacent the pivot connection 20 with a slot 21 enabling limited up and down linear movement of the arm 19 with respect to the arm 18.

The other end of the arm 19 is coupled to a shifting means in the form of a triangular member 22. The arm 19 is preferably pivotably coupled to the member 22 at a corner 23 thereof. The plate 22 is itself pivotably coupled at 24 to the back plate 10.

The member 22 also has coupled thereto a pulley 25 having a groove 26. The pulley 25 has axially extending therefrom a friction roller 27 which functions for a purpose to be hereafter described.

The groove 26 of the pulley 27 receives a spring belt 28 which connects with a driving pulley 29. The pulley 29 in turn is coupled through a gear train or the like, schematically indicated at 30, to conventional motor drive 31.

The idler pulley 15 has formed therewith a friction member 32 of larger diameter which is adapted to be driven by the friction roller 27 in a manner to be hereafter described. A spring belt 33 connects the idler pulley 15 with the take-up pulley 13. The spring belt 33 is twisted in a conventional manner to obtain corresponding rotation between the idler pulley 15 and the take-up pulley 13.

As shown in the views of FIGURES 2 and 3, the projector is provided with a conventional front panel 34 through which the shaft 17 extends to be coupled to a control knob 35. As shown in FIGURE 3, the panel 34 has embossed thereon the markings or nomenclature "rewind," "off," and "forward" corresponding to the operator's use of the projector. For convenience in usage, a dot 36 or other indicating means may be embossed on the knob 35 to indicate the particular angle or position in which it is disposed.

The other end of the shaft 17 is coupled to a contact or switch assembly 37 which is journaled on a supporting arm 38 appropriately secured to the projector back panel.

The switch assembly may include three angularly spaced contacts, for example, 39, 40, and 41 extending axially therefrom.

The motor 31 has contacts 42 and 43 which are adapted to be electrically connected to a pair of the contacts 39, 40, and 41 when the control knob 35 is disposed in either its rewind or forward positions. In addition, contact 44 may be provided for connecting two of the contacts 39, 40, 41 to a lamp 46 when the control knob 35 is disposed in its forward position, and open contact 45 provided to disconnect the lamp when the knob 35 is in rewind position.

For purposes of furnishing power to the motor 31 and lamp 46, a source of electrical power has been indicated at 47 as schematically connected to incoming line 48 continuously connecting with the contact 39 and another line 49 connecting with the motor 31 and lamp 46 as heretofore described. Thus, in the forward position, for example, contacts 40 and 41 will be connected to contacts 43 and 44 and in the rewind position to contacts 42 and 45. Such switching arrangements are well known in the art.

The operation of the film feeding and rewind mechanism of the present invention may now be described. The operator first rotates the control knob 35 to the desired projecting or forward position, which as shown in FIGURE 3 with the indicator 36 is disposed adjacent the marking "forward." In this position, the linkage arms 18 and 19 will be disposed in the solid line position of FIGURE 1. Similarly, the shifting means or plate 22 and coupled pulley 25 and friction roller 27 will be positioned as shown. Thus, the friction roller 27 will be in engagement with the friction member 32 such that rotation of the friction roller 27 in a clockwise direction will effect corresponding counter clockwise rotation of the friction member 32 and the connected take-up pulley 13.

The friction roller 27 is driven, of course, through the pulley 25, which is in turn driven through the driving pulley 29 coupled to a suitable gear train or the like 30 to motor 31.

After projection has taken place and the machine has been turned off, for example, the knob 35 will be rotated through forty-five degrees to a position such that the indicator 36 is aligned with the marking "off." As this movement occurs, the shaft 17 will rotate to drivingly shift the arm 18 and arm 19 coupled thereto to the dotted line positions 18″ and 19″, respectively, as shown in FIGURE 1. During this changeover, since the pivot connection 20 will still be maintained at approximately the same distance from the plate portion 23 to which the other end of the arm 19 is coupled, no movement of the plate 22 will occur. Of course, the slot 21 is necessary in order to allow the arm 19 to move overcenter with respect to the arm 18.

When it is desired to place the projector in a rewind position, the control knob 35 is moved another forty-five degrees to a position such that the indicator 36 is aligned with the marking "rewind." As this movement occurs, the arm 18 will be actuated to the dotted line position 18′ of FIGURE 1 approximately ninety degrees disposed from the solid line position thereof. Similarly, the arm 19 will drive the member 22 about the pivot point 24 to the dotted line position 22′. In this position, the shift plate 22 will be disposed approximately forty-five degrees from its initial position and located such that the pulley 25 will be in the position 25′ whereby the friction roller 27 formed therewith will be engaging the roller 11 coupled to the rewind reel 12.

As this movement occurs, it is important to note that the spring belt 28 will move overcenter with respect to the pivot point 24 and its coupled connections to pulleys 25 and 29. In consequence, the spring 28 will bias the friction roller 27 towards the friction member 32 in the solid line position of FIGURE 1; similarly, when the knob 35 is turned to the rewind position and the spring 28 moves to its dotted line position 28′ the roller 27 will be spring biased towards the roller 11 such that a positive friction drive will result.

Of course, as heretofore mentioned, when the knob 35 is turned to the various positions indicated, suitable electrical connections will be made with the motor and lamp as previously described.

It will be noted that by employing a somewhat smaller diameter pulley 15 than the pulley 13 coupled to the take-up reel 14, that the take-up reel 14 will rotate at a somewhat slower speed than the rewind wheel 12. Thus, two speed operation of the motor 31 is not required.

It will be appreciated that various changes and modifications may be made in the film feeding and rewind apparatus of the present invention without departing from the basic spirit and scope of the invention. Such changes and modifications are deemed to be within the scope of the following claims.

What is claimed is:

1. In a motion picture projector having spaced take-up rotary reel means and rewind rotary reel means and including a motor and lamp, the combination comprising: manually operable rotatable means coupled to said projector, said rotatable means being adapted for disposition in three given angular locations identified as rewind, off, and forward positions, said off position being disposed between said rewind and forward positions; pivotable shifting means having a given pivot point; linkage means interconnecting a first portion of said shifting means and said rotatable means, said linkage means actuating said shifting means from a first position to a second position in response to movement of said rotatable means from said forward to said rewind position, and said linkage means being constructed to pivot with respect to said shifting means without movement of said shifting means in response to movement of said rotatable means from said forward position to said off position; and, driving means coupled to a second portion of said shifting means spaced from said given pivot point, said driving means engaging said takeup rotary reel means in said first position and said rewind rotary reel means in said second position.

2. The subject matter according to claim 1, in which said shifting means comprises a triangularly shaped member with said given pivot point, said first portion and said second portion being disposed at respective corners thereof.

3. The subject matter, according to claim 1, in which said driving means embodies spring belt means, said spring belt means being designed to move overcenter relative to said given pivot point in response to movement of said shifting means between said first position and said second position, whereby said spring belt means biases said driving means into engagement with said takeup rotary reel means in said first position and biases said driving means into engagement with said rewind rotary reel means in said second position.

4. In a motion picture projector having spaced takeup rotary reel means and rewind rotary reel means and including a motor and lamp, the combination comprising: manually operable rotatable means coupled to said projector, said rotatable means being adapted for disposition in three given angular locations identified as rewind, off, and forward positions, said off position being disposed between said rewind and forward positions; pivotable shifting means coupled to said projector, said shifting means having a given pivot point; linkage means interconnecting a first portion of said shifting means and said rotatable means, said linkage means actuating said shifting means from a first position to a second position in response to movement of said rotatable means from said forward to said rewind position, and said linkage means being constructed to pivot with respect to said shifting means without movement of said shifting means in response to movement of said rotatable means from said forward position to said off position; and, a motor driven member coupled to a second portion of said shifting means spaced from said given pivot point, said motor driven member engaging said takeup rotary reel means in said first position and said rewind rotary reel means in said second position.

5. The subject matter, according to claim 4, in which said motor driven member comprises a driven pulley having axially extending therefrom a friction roller for engaging said takeup rotary reel means and said rewind rotary reel means, respectively.

6. The combination, according to claim 4, in which said shifting means comprises a triangularly shaped member with said given pivot point, said first portion, and said second portion being disposed at respective corners thereof.

7. The subject matter, according to claim 4, in which said motor driven member has coupled thereto spring belt means, said spring belt means being designed to move overcenter relative to said given pivot point in response to movement of said shifting means between said first position and said second position.

8. In a motion picture projector including a motor and a lamp, the combination comprising: an idler pulley coupled for rotation to said projector; a takeup rotary reel member coupled for rotation to said projector; belt means interconnecting said takeup rotary reel member and said idler pulley; rewind rotary reel means coupled for rotation to said projector; manually operable rotatable means coupled to said projector, said rotatable means being adapted for disposition in three given angular locations identified as rewind, off, and forward positions, said off position being disposed between said rewind and forward positions; pivotable shifting means coupled to said projector, said shifting means having a given pivot point; linkage means interconnecting a first portion of said shifting means and said rotatable means, said linkage means actuating said shifting means from a first position to a second position in response to movement of said rotatable means from said forward to said rewind position, and said linkage means being constructed to pivot with respect to said shifting means without movement of said shifting means in response to movement of said rotatable means from said forward position to said off position; driving means coupled to a second portion of said shifting means spaced from said given pivot point, said driving means engaging said idler pulley to drive said takeup rotary reel means in said first position and engaging said rewind rotary reel means in said second position.

9. The combination, according to claim 8, in which said driving means embodies spring belt means, said spring belt means being designed to move overcenter relative to said given pivot point in response to movement of said shifting means between said first position and said second position.

References Cited in the file of this patent
UNITED STATES PATENTS

| | | |
|---|---|---|
| 2,555,643 | Harrison | June 5, 1951 |
| 2,687,259 | Owens | Aug. 24, 1954 |
| 2,793,039 | Hironimus | May 21, 1957 |
| 2,911,849 | Mitchell et al. | Nov. 10, 1959 |